US011132366B2

(12) United States Patent
Mayr et al.

(10) Patent No.: US 11,132,366 B2
(45) Date of Patent: Sep. 28, 2021

(54) TRANSFORMING DIRECTED ACYCLIC GRAPH SHAPED SUB PLANS TO ENABLE LATE MATERIALIZATION

(71) Applicant: SAP SE, Walldorf (DE)

(72) Inventors: Manuel Mayr, Walldorf (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 177 days.

(21) Appl. No.: 16/371,616

(22) Filed: Apr. 1, 2019

(65) Prior Publication Data

US 2020/0311082 A1  Oct. 1, 2020

(51) Int. Cl.
*G06F 16/2453* (2019.01)
*G06F 16/901* (2019.01)
*G06F 16/22* (2019.01)

(52) U.S. Cl.
CPC .... *G06F 16/24542* (2019.01); *G06F 16/2246* (2019.01); *G06F 16/9024* (2019.01)

(58) Field of Classification Search
CPC ........... G06F 16/24542; G06F 16/9024; G06F 16/2246
USPC ........................................................ 707/718
See application file for complete search history.

(56) References Cited

U.S. PATENT DOCUMENTS

| | | | | |
|---|---|---|---|---|
| 8,402,469 B2* | 3/2013 | Bose | .................. | G06F 16/2455 718/104 |
| 2015/0149442 A1* | 5/2015 | Kim | .................. | G06F 16/24545 707/719 |
| 2015/0269202 A1* | 9/2015 | Ku | .................... | G06F 16/24542 707/715 |
| 2016/0070752 A1* | 3/2016 | Mortazavi | ......... | G06F 16/24532 707/718 |
| 2018/0089270 A1* | 3/2018 | Qiu | .................... | G06F 16/24542 |
| 2019/0384844 A1* | 12/2019 | Ding | ................. | G06F 16/24524 |
| 2020/0110827 A1* | 4/2020 | Freedman | ......... | G06F 16/24542 |

OTHER PUBLICATIONS

Neumann, Thomas, et al., "Generating optimal DAG-structured query evaluation plans", CRSD 2009, vol. 24, ©2009 Springer, pp. 103-117.*
Goasdoué, François, et al., "CliqueSquare: Flat Plans for Massively Parallel Queries", ICDE 2015, Seoul, South Korea, Apr. 13-17, 2015, pp. 771-782.*
Yuan, Lingyun, et al., "Study on Distributed Complex Event Processing in Internet of Things based on Query Plan", CYBER 2015, Shenyang, China, Jun. 8-12, 2015, pp. 666-670.*
Chen, Ting, et al., "A Selective Checkpointing Mechanism for Query Plans in a Parallel Database System", BigData 2013, Silicon Valley, CA, Oct. 6-9, 2013, pp. 237-245.*

* cited by examiner

*Primary Examiner* — Robert Stevens
(74) *Attorney, Agent, or Firm* — Mintz, Levin, Cohn, Ferris, Glovsky and Popeo, P.C.

(57) ABSTRACT

A query is received at a database execution engine. A query plan including a sub plan structured as a directed acyclic graph is determined by the database execution engine. A set of trees characterizing the sub plan is generated by the database execution engine and using the directed acyclic graph. The set of trees include a first tree and a second tree, the first tree including at least one leaf characterizing a memory store operation and the second tree including a root characterizing a memory access operation. The set of trees are stored for use in execution of the query at run time. Related systems, methods, and articles of manufacture are also described.

18 Claims, 5 Drawing Sheets

TRANSFORMING DIRECTED ACYCLIC GRAPH SHAPED SUB PLANS TO ENABLE LATE MATERIALIZATION

TECHNICAL FIELD

The subject matter described herein relates to database management, and more particularly, query execution planning.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance.

SUMMARY

In an aspect, a query is received at a database execution engine. A query plan including a sub plan structured as a directed acyclic graph is determined by the database execution engine. A set of trees characterizing the sub plan is generated by the database execution engine and using the directed acyclic graph. The set of trees include a first tree and a second tree, the first tree including at least one leaf characterizing a memory store operation and the second tree including a root characterizing a memory access operation. The set of trees are stored for use in execution of the query at run time.

One or more of the following features can be included in any feasible combination. For example, the memory store operator can characterize a database operation that stores fields required by other operators within nodes of the first tree. The memory access operator can characterize a second database operation that accesses the fields stored by the memory store operator, the accessed fields used by at least one additional operator within nodes of the second tree. The generating can include: restructuring the sub plan into the set of trees that, taken together, represent operations of the directed acyclic graph; inserting the memory store operator into the leaf of the first tree; and inserting the memory access operator into the root of the second tree. The sub plan can characterize a collection of operators to access and/or operate on data in a database storage system, the collection of operators arranged in the directed acyclic graph. At least one materialization operator can be inserted into the first tree and the second tree. The inserting can include first traversing the first tree and the second tree to calculate required database columns and second traversing the first tree and the second tree to insert the materialization operators. A tree can be generated for each branch of the directed acyclic graph. The database execution engine can include a query optimizer including a plan generator that receives the sub query and performs the generating. The query can be executed during runtime. The execution can including using the first tree and the second tree to perform operations on the database, the operations characterized by the first tree and the second tree. The generating of the set of trees characterizing the sub plan can be performed by a query optimizer forming part of the database execution engine. The database execution engine can include a query optimizer and a query execution engine coupled to the query optimizer, the query optimizer including: an execution interface, a cost function, and a plan compiler including a plan generator; the query execution engine including: an execution interface, a plan execution, precompiled operations, code generated operations, and an execution engine application programming interface.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
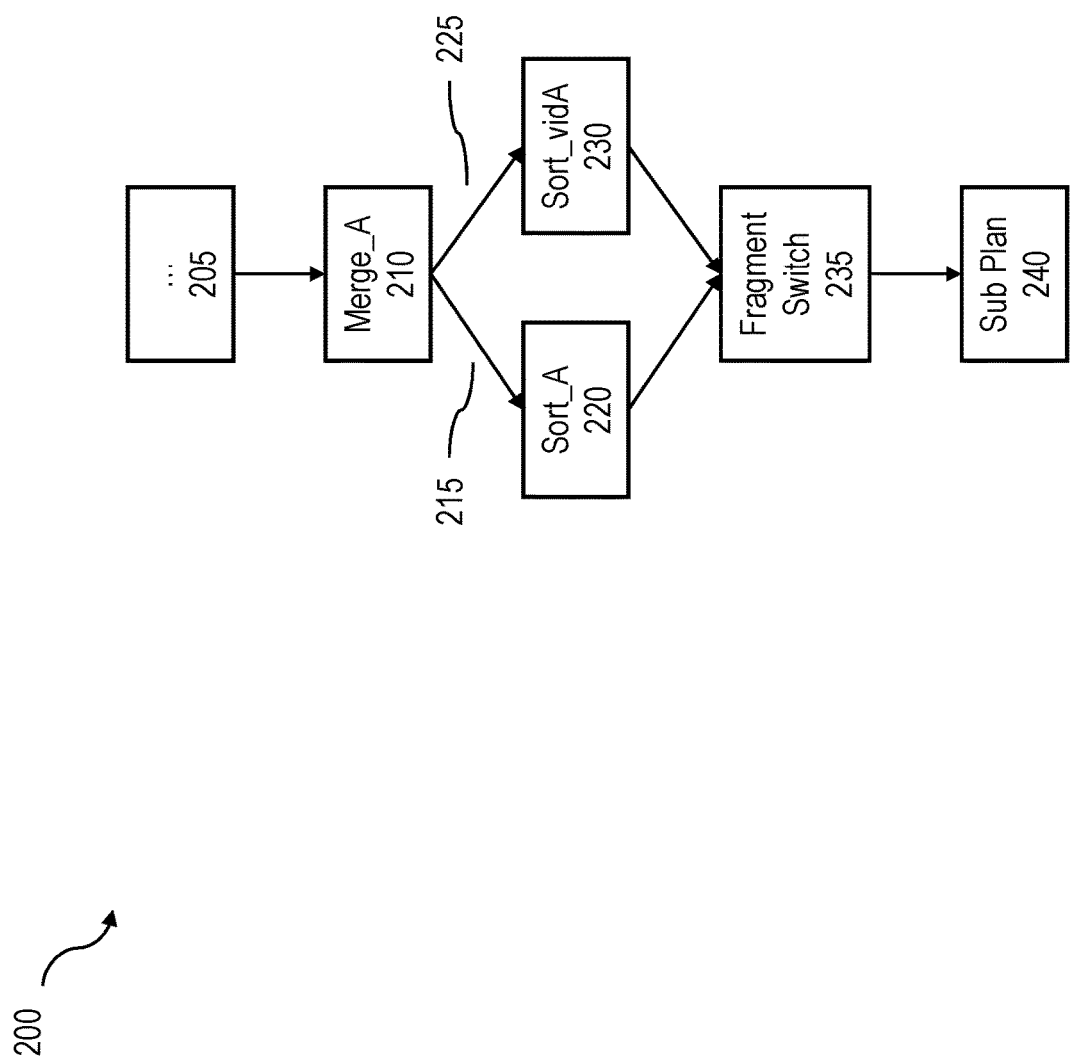
FIG. 1 illustrates an example directed acyclic graph (DAG)-shaped query sub plan that includes an orthogonal sorting strategy for fragments.

Database management systems and operations performed on the data managed by a database management system have become increasingly complex. For example, a database management systems (or database for short) can support relatively complex online analytical processing (OLAP, which can perform multi-dimensional analysis) to more straightforward transaction based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

In some example embodiments, there may be provided an execution engine that may decouple the higher-level, application layer from the database layer (e.g., the persistence or storage layer where data including database tables may be stored and/or queried using instructions, such as commands and/or the like). The execution engine may be implemented separately from the database layer and/or the application layer. Furthermore, the execution engine may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan.

The execution engine may be configured to perform some operations itself, while the execution engine may send some operations (e.g., relatively basic commands, such as reads, writes, scans, and/or the like) to the database layer. Furthermore, the execution engine may receive corresponding responses from the database layer where data is stored/persisted and certain commands, such as reads, writes, scans, and/or the like, can be performed. The execution engine may perform more complex execution operations, such as rule-based operations including relatively more complex operations such as joins, projections, and/or the like, while accessing the database's storage/persistence layer when needed to read, write, update, and/or perform other operations.

The execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein can perform query execution for a variety of database types and send queries to the different types of database layers (and/or their storage/persistence layer) and handle the corresponding responses.

In many database systems, a SQL query is translated into a tree-shaped algebraic plan that reflects its dynamic semantics, and yet is still generalized such that it can be utilized by different database systems. Additionally, each algebra operator can be accompanied by a set of field dependencies that is resolved before the operator can commence its work. In some implementations, the query execution engine can leverage field dependencies along with the structure of the tree-shaped plan to derive a late materialization strategy that can be tailored to the specifics of a columnar persistence layer of the database system. In this context, the query execution engine reformulates the algebraic plan to interpose materialization operators between adjacent operators that indicate where values need to be materialized. In another transformation that accompanies such late materialization, columns can be discarded that are not needed in the plan execution (e.g., as early as possible). Both transformations can be accomplished by a set of tree traversals of the query plan that can involve: (1) a top-down traversal to derive the needed columns or rows; (2) a bottom up traversal to infer the live columns (offered columns) combined with reformulating of the plan for explicit materialization; (3) a top-down traversal to propagate columns that need to be kept alive if needed by the subsequent operators; (4) a bottom-up traversal to calculate the eventual output format of each operator, which may discard columns that are never used in the plan.

Because the above approach is tailored to tree-shaped plans it leads to several problems when presented with a directed acyclic graph (DAG)-shaped query sub plans (referred to as DAG-shaped sub plans). A DAG-shaped query sub plan is a portion of a query plan that is formulated in terms of a directed acyclic graph, in which a finite number of nodes (e.g., vertices) are connected (e.g., via edges or arcs) such that there is no loops back to previously visited nodes. In some implementations, the current subject matter can be applicable to DAG-shaped plans that are rooted at a single operator (which may be artificial), and is therefore not restricted to sub plans. In other words, the plan can be considered as a lattice (e.g., partially ordered set). With the notion of a lattice, some implementations of the current subject matter can be applied to join-semilattices (e.g., a partially ordered set that has supremum).

FIG. 1 illustrates an example DAG-shaped query sub plan 200 that includes an orthogonal sorting strategy for fragments to preserve orderedness on value IDs (e.g. the Main fragment). The example sub plan 200 includes a root node 205, connected to a merge_A operator 210. The sub plan 200 branches after the merge_A operator 210 and includes a first path 215 to a sort_A operator 220 and a second path 225 to a sort_vidA operator 230, which perform sort operation on column A and a sort of the value ID of column A, respectively. The sub plan 200 continues to a FragmentSwitch operator 235, after sort_A operator 220 and sort_vidA operator 230, respectively. Node 240 indicates that the query plan continues to another sub plan. In this example sub plan 200, sort_A operator 220 depends on the materialization of the value of column A, while sort_vidA operator 230 depends on the value ID of column A, rather than the actual value. Merge_A operator 210 merges the sorted input streams from Sort_A operator 220 and Sort_vidA operator 230 into a globally sorted result based on the values of columns A. FragmentsSwitch operator 235 relays data chunks based on their origin (e.g., fragment id).

If a simple tree walk was utilized for processing the example query sub plan 200 (for example to insert materialization operators according to a late materialization strategy), a problem arises because a decision would have to be made whether to first descend along path 215 or path 225, continuing to the sub plan 240. If it is decided to descend along path 215, the dependency on A is propagated into the sub plan. Because a tree-shape is assumed for the processing, in the path 225, the FragmentSwitch operator 235 and the respective sub plan is not revisited, and hence this approach misses propagation of the dependency of vidA into the sub plan 240 below the FragmentSwitch operator 235. This results in a costly re-materialization of vidA even though it may have already been materialized by some operator in the sub plan 200.

As another example, when a column A has already been materialized by a sub plan, algorithms for processing the sub plan (for example to insert materialization operators according to a late materialization strategy) may discard positional information that is needed for materialization and hence fail to materialize the value id needed by sort_vidA operator 230 entirely. For example, the materialization operator needs the positional information to fetch the actual values from a column. In an example, an operator in Sub Plan 240 needs to materialize column A in order to perform some calculations, e.g. a FILTER ( . . . WHERE A=expr). In this case, by descending the path along Sort_A 220 it would not incur another explicit materialization of A, interposed between Sort_A 220 and FragmentSwitch 235. However, the materialization would have been the means by which the positional information would have been retained, since there is not a way to propagate the needed fields along Sort_vidA 230. Here, there is another materialization of vidA weaved in between Sort_vidA 230 and FragmentSwitch 235, but no way to propagate down into the FragmentSwitch 235 and Sub Plan 240 via tree walk algorithms.

In some implementations of the current subject matter, a DAG-shaped query sub plan can be transformed into a set of plans that include two or more tree-shaped plans that represent the original DAG-shaped query sub plan but can allow for efficient late materialization operations utilizing tree-walk algorithms. In some implementations, the tree-walk algorithms do not need to be modified in order to support such DAG-shaped query sub plans. In order to transform DAG-shaped query sub plans into two or more tree-shaped plans, two memory operators can be utilized. These operators, in some implementations, referred to as Retain and RetainRef, can allow for decoupling of the branches of the DAG-shaped query sub plan and therefore enable late materialization approaches. RetainRef operator can include a memory store operator that stores required fields of operators in a given sub plan. Retain can include a memory access operator that accesses the information stored by a RetainRef operator.

Figure 2:
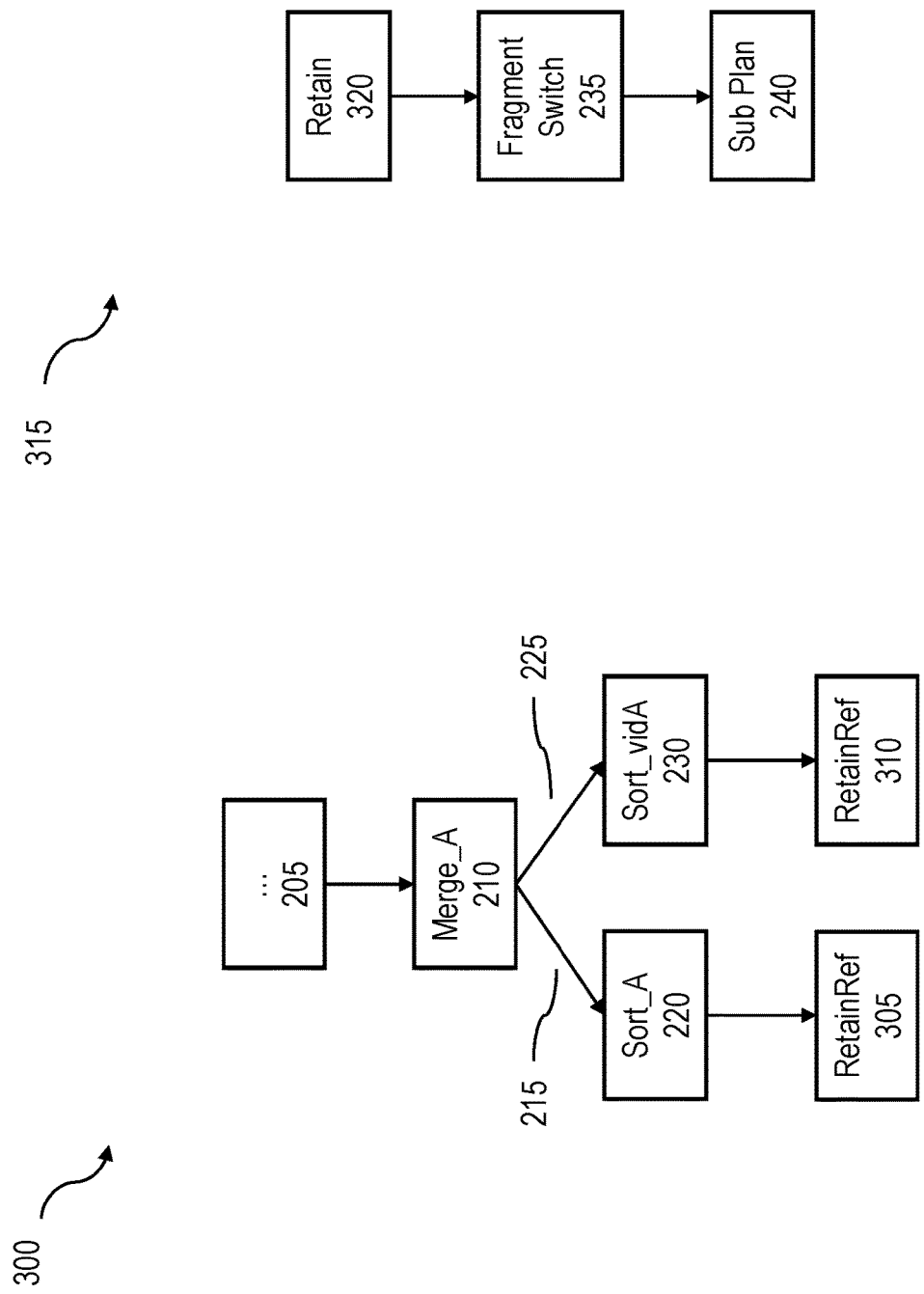
FIG. 2 illustrates an example set of tree-shaped sub plans.

For example, with respect to the query sub plan 200 illustrated in FIG. 1, the current subject matter can enable the sub plan 200 to be decoupled from the FragmentSwitch operator 235 such that the plan is divided it into several sub-strategies (also referred to as tree-shaped sub plans). For example, FIG. 2 illustrates a first tree-shaped sub plan 300 (e.g., sub-strategy) in the set of sub plans. RetainRef operators 305 and 310 are inserted to form new leaves of the resulting first tree-shaped sub plan 300. The resulting disentangled plan, referred to as the second tree-shaped sub plan 315, includes a Retain operator 320 inserted above the FragmentSwitch operator 235. The Retain operator 320 is associated with its respective RetainRef nodes 305, 310 in the first tree-shaped sub plan 300.

Since the resulting set of tree-shaped sub plans only includes tree-shaped plans, it can enable the top-down/bottom-up derivation of the above-mentioned late materialization strategy. The above-described top-down/bottom-up traversals can be modified to walk over the set of tree-shaped sub plans in topological order or reverse topological order respectively rather than traversing a single plan. Such an approach can include, for example: (1) a top-down traversal that walks the set of tree-shaped sub plans in order of first tree-shaped sub plan 300 then second tree-shaped sub plan 315 to calculate the needed columns; (2) a bottom-up traversal that derives the live columns walks the bundle in order second tree-shaped sub plan 315 then first tree-shaped sub plan and propagates live columns at the FragmentsSwitch 235 to the RetainRef operators 305, 310; (3) a top-down traversal used to propagate the needed columns into the sub plan again walks the plan bundle in order first tree-shaped sub plan 300 then second tree-shaped sub plan 315, in which the Retain operator 320 uses the propagated fields of its associated RetainRef operators 305, 310 to propagate them further into the sub plan; and (4) calculate a final output format by at least walking the set of tree-shaped sub plans again in order second tree-shaped sub plan 315 then first tree-shaped sub plan.

In some implementations, this approach can solve both problems outlined above by introducing a plan transformation and an adaption of processing algorithms to walk over sets of plans in topological order.

Figure 3:
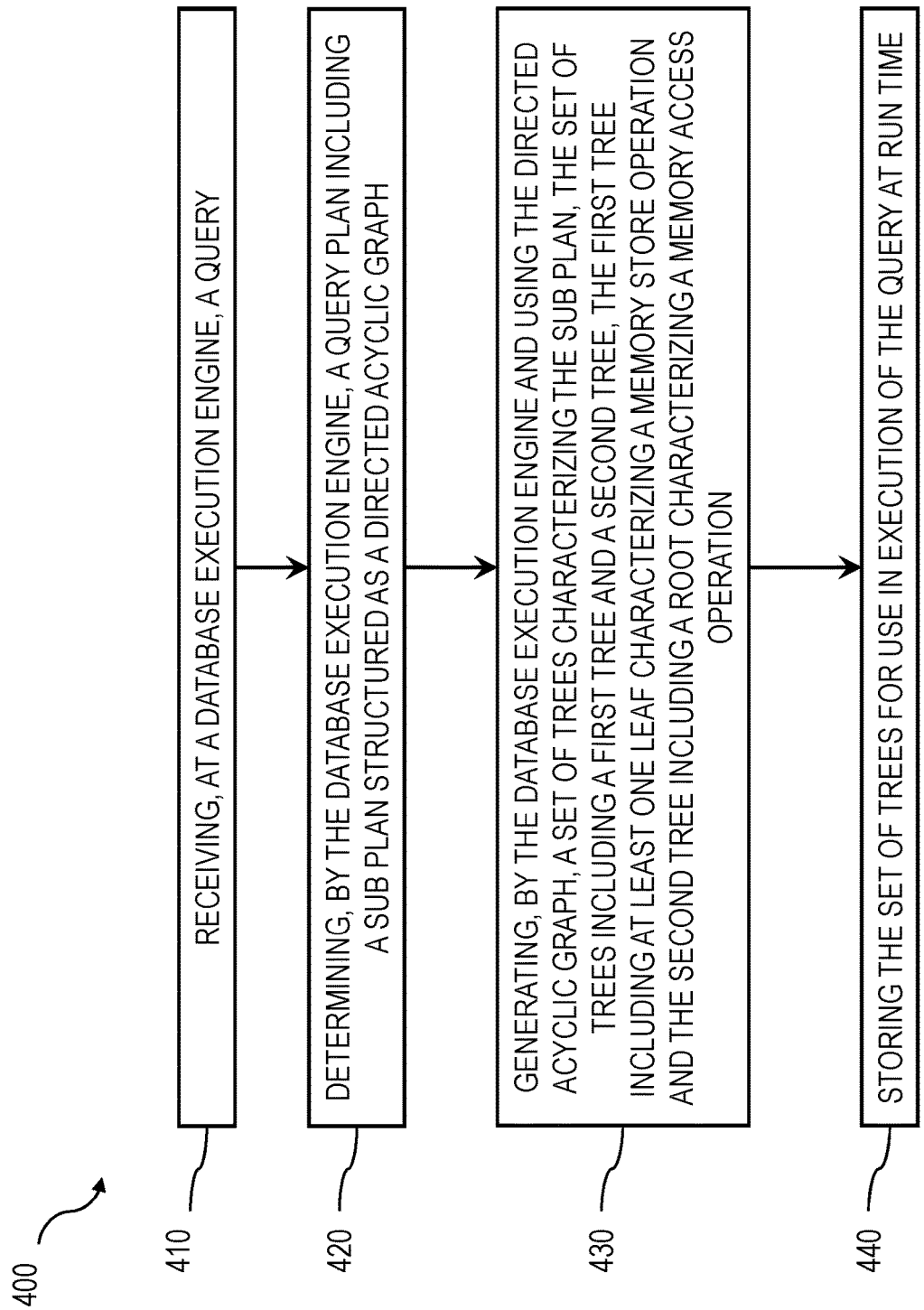
FIG. 3 is a process flow diagram illustrating an example process that can transform a DAG-shaped query sub plan into a set of plans that include two or more tree-shaped plans that represent the original DAG-shaped query sub plan but can allow for efficient late materialization operations utilizing tree-walk algorithms.

FIG. 3 is a process flow diagram illustrating an example process 400 that can transform a DAG-shaped query sub plan into a set of plans that include two or more tree-shaped plans that represent the original DAG-shaped query sub plan but can allow for efficient late materialization operations utilizing tree-walk algorithms.

At 410, a query is received at a database execution engine. The query can include a request for information from a database and can be received, for example, from an application separate from the database execution engine. The query can be received, for example, at design time.

At 420, a query plan can be determined by the database execution engine. The query plan can include a sub plan structured as a directed acyclic graph. The query plan can represent a sequence of operations, such as instructions, commands, and/or the like, to access data in the database. The directed acyclic graph can include nodes and edges, with operators forming the nodes of the graph and the edges characterizing the sequence of execution of the operators (e.g., the sub plan characterizes a collection of operators to access and/or operate on data in a database storage system and the collection of operators are arranged in the directed acyclic graph).

At 430, a set of trees characterizing the sub plan can be generated by the database execution engine and using the directed acyclic graph. The set of trees can include a first tree and a second tree, which, taken together, characterize the operators contained in the directed acyclic graph. For example, a first number of nodes of the acyclic graph can be contained in the first tree and the remaining nodes of the acyclic graph can be contained in the second tree. The first tree includes at least one leaf characterizing a memory store operation and the second tree includes a root characterizing a memory access operation. An example of first and second trees are illustrated and described with respect to FIG. 2. While first and second trees are described, some implementations of the current subject matter can include generating a set of trees including any number of trees greater than one.

The memory store operator can characterize a database operation that stores fields required by other operators within nodes of the first tree. For example, the memory store operator can include the RetainRef operator described above, although in some implementations, other memory store operators are possible. The memory access operator can characterize a second database operation that accesses the fields stored by the memory store operator. The accessed fields can be used by at least one additional operator within nodes of the second tree. For example, the memory access operator can include the Retain operator described above, although in some implementations, other memory access operators are possible.

In some implementations, the generating can include restructuring the sub plan into the set of trees that, taken together, represent operations of the directed acyclic graph. The memory store operator can be inserted into the leaf of the first tree and the memory access operator can be inserted into the root of the second tree.

In some implementations, at least one materialization operator can be inserted into the first tree and/or the second tree. The inserting can include first traversing the first tree and the second tree to calculate required database columns. The traversing can be performed in topographical order corresponding to the operators defined by the directed acyclic graph (e.g., top-down traversal and such that the first tree is traversed first, followed by the second tree). The inserting can include second traversing the first tree and the second tree to insert the materialization operators. The second traversing can be performed in reverse topological order corresponding to the operators defined by the directed acyclic graph (e.g., bottom-up and such that the second tree is traversed first, followed by the first tree).

In some implementations, a tree is generated for each branch of the directed acyclic graph. A branch can be considered present for any node in the graph that includes two or more incoming edges (e.g., arcs) (e.g., wherever neighborhood(v)>1, where v is an vertex (node) in the DAG). In some implementations, the database execution engine includes a query optimizer including a plan generator that receives the sub query and performs the generating.

At 440, the set of trees are stored for use in execution of the query at run time. For example, the storing can include placing the set of trees into memory for access by a query execution engine.

Although a few variations have been described in detail above, other modifications or additions are possible. For example, the current subject matter is not limited to sub plans, but can be applied to entire plans as well.

Figure 4:
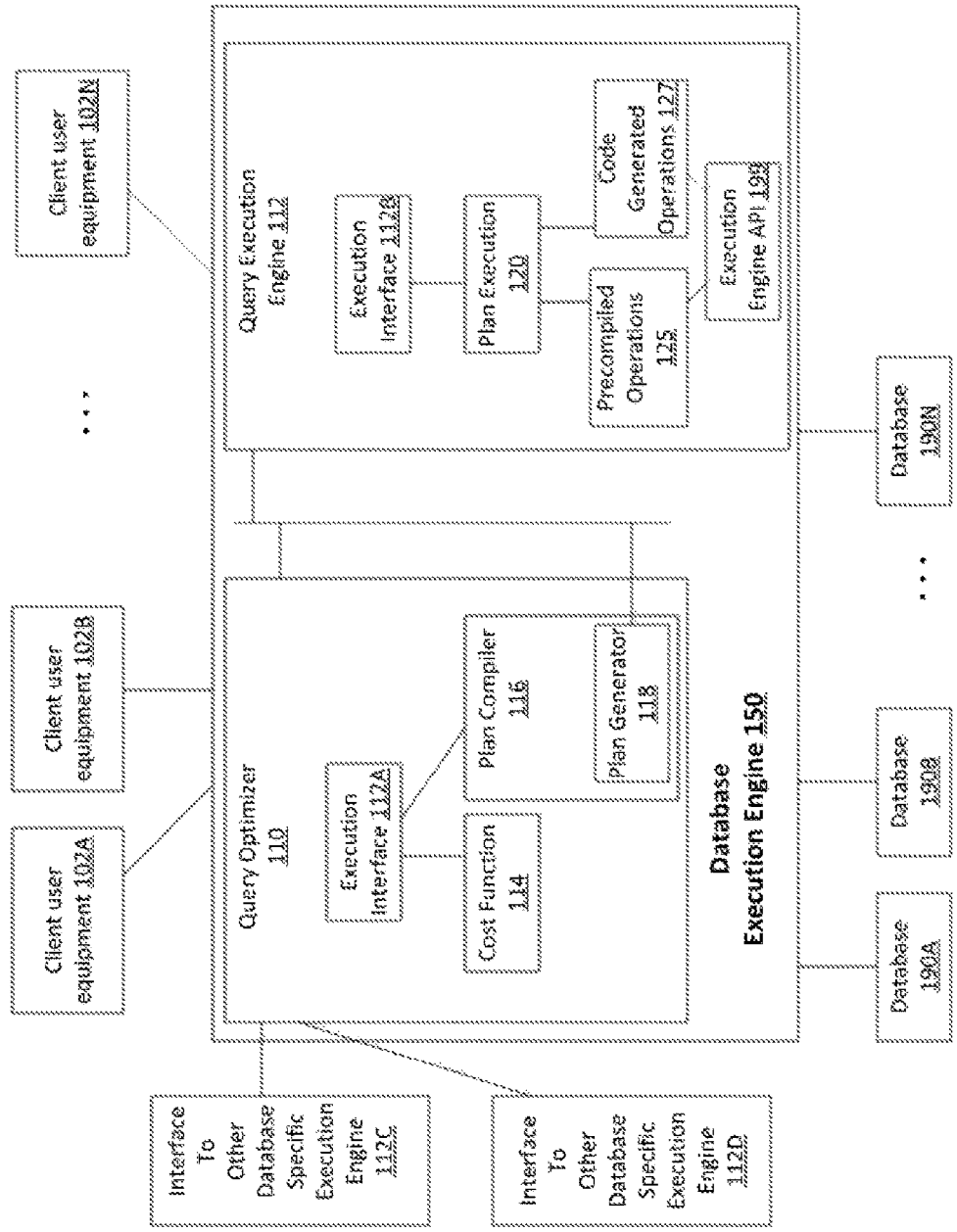
FIG. 4 depicts an example of a system, in accordance with some example implementation, that can transform a DAG-shaped query sub plan into a set of plans that include two or more tree-shaped plans that represent the original DAG-shaped query sub plan but can allow for efficient late materialization operations utilizing tree-walk algorithms.

FIG. 4 depicts an example of a system 100, in accordance with some example implementations. The example system 100 can include an execution engine 112 that can be configured to perform the above described transformation of a DAG-shaped query sub plan into a set of plans that include two or more tree-shaped plans that represent the original DAG-shaped query sub plan but can allow for efficient late materialization operations utilizing tree-walk algorithms.

The system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 4, the databases 190A represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. As part of the optimization process, DAG-shaped query sub plans can be transformed into sets of tree-shaped query sub plans, for example, as described above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112. In some implementations, the plan generator 118 can perform the functionality of transforming DAG-shaped query sub plans into sets of tree-shaped query sub plans.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

In some example embodiments, the query execution engine 150 may run, as noted above, just-in-time code 127 generated for some query operations, while pre-compiled code 125 may be run for other operations. Moreover, the query execution engine 150 may combine the generated code 127 with pre-compiled code 125 to further optimize execution of query related operations. In addition, the query execution engine 150 may provide for a plan execution framework that is able to handle data chunk(s), pipelining, and state management during query execution. Furthermore, the query execution engine 150 may provide the ability to access table storage via an abstract interface to a table adapter, which may reduce dependencies on specific types of storage/persistence layers (which may enable use with different types of storage/persistence layers).

Figure 5:
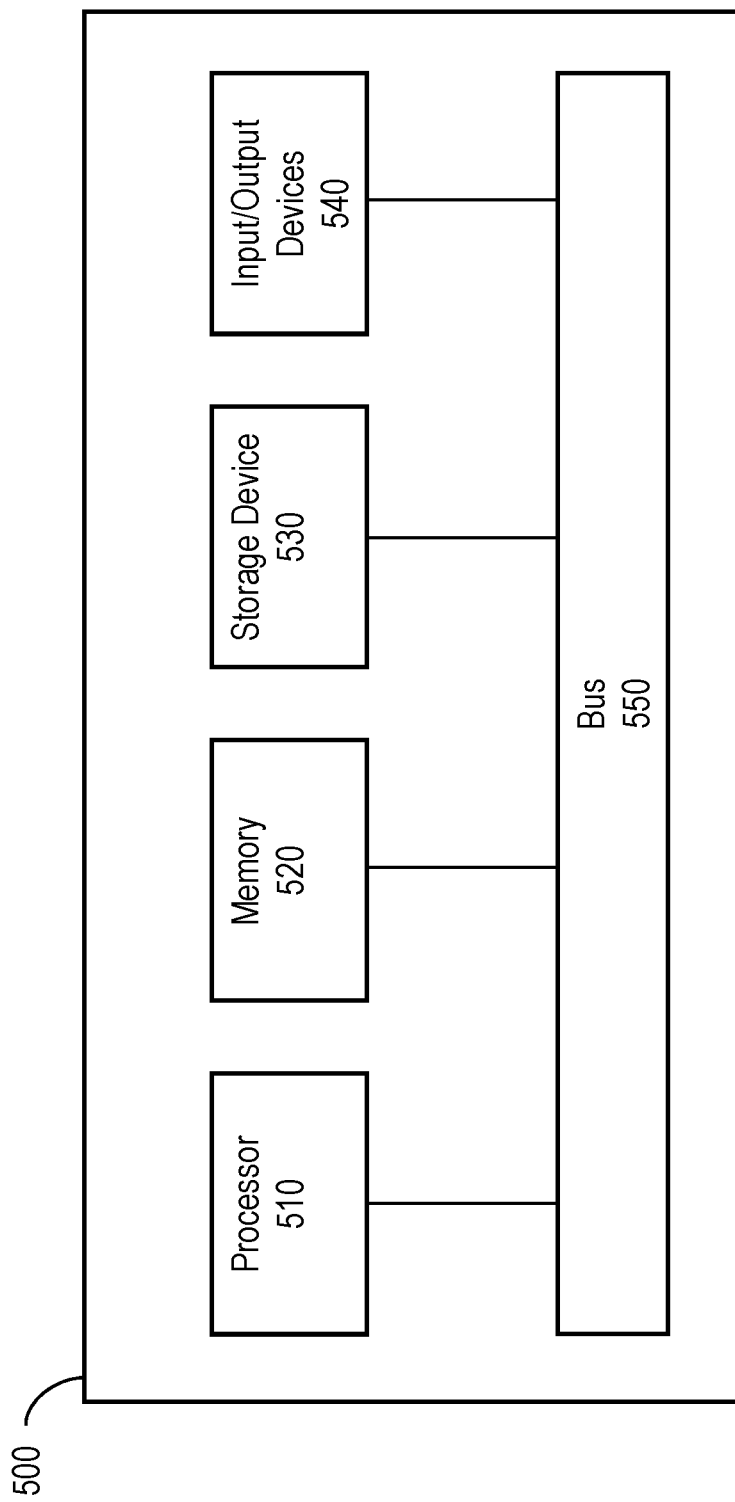
FIG. 5 depicts a block diagram illustrating a computing system consistent with implementations of the current subject matter.

FIG. 5 depicts a block diagram illustrating a computing system 500 consistent with implementations of the current subject matter. Referring to FIGS. 4 and 5, the computing system 500 can be used to implement the database management system 110 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the database management system 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state device, and/or any other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods.

What is claimed is:

1. A system comprising:
    at least one processor; and
    at least one memory storing instructions which, when executed by the at least one processor, result in operations comprising:
    receiving, at a database execution engine, a query;
    determining, by the database execution engine, a query plan including a sub plan structured as a directed acyclic graph;
    generating, by the database execution engine and using the directed acyclic graph, a set of trees characterizing the sub plan, the set of trees including a first tree and a second tree, the first tree including at least one leaf characterizing a memory store operation and the second tree including a root characterizing a memory access operation, the memory store operator characterizing a database operation that stores fields required by other operators within nodes of the first tree and for use by operators within nodes of the second tree;
    inserting, into the first tree and/or the second tree, at least one materialization operator, the inserting including first traversing the first tree and the second tree to calculate required database columns and second traversing the first tree and the second tree to insert the at least one materialization operator; and storing the set of trees for use in execution of the query at run time.

2. The system of claim 1, wherein the memory access operator characterizes a second database operation that accesses the fields stored by the memory store operator, the accessed fields used by at least one additional operator within nodes of the second tree.

3. The system of claim 1, wherein the generating includes:
restructuring the sub plan into the set of trees that, taken together, represent operations of the directed acyclic graph;
inserting the memory store operator into the leaf of the first tree; and
inserting the memory access operator into the root of the second tree.

4. The system of claim 1, wherein the sub plan characterizes a collection of operators to access and/or operate on data in a database storage system, the collection of operators arranged in the directed acyclic graph.

5. The system of claim 1, the operations further comprising:
generating, for each branch of the directed acyclic graph, a tree.

6. The system of claim 1, wherein the database execution engine includes a query optimizer including a plan generator that receives the sub query and performs the generating.

7. The system of claim 1, the operations further comprising:
executing, during runtime, the query, the execution including using the first tree and the second tree to perform operations on the database, the operations characterized by the first tree and the second tree.

8. The system of claim 1, wherein the generating of the set of trees characterizing the sub plan is performed by a query optimizer forming part of the database execution engine.

9. The system of claim 1, wherein the database execution engine includes a query optimizer and a query execution engine coupled to the query optimizer, the query optimizer including: an execution interface, a cost function, and a plan compiler including a plan generator; the query execution engine including: an execution interface, a plan execution, precompiled operations, code generated operations, and an execution engine application programming interface.

10. The system of claim 1, wherein the first traversing is performed in topological order corresponding to operators defined by the directed acyclic graph and the second traversing is performed in reverse topological order corresponding to operators defined by the directed acyclic graph.

11. The system of claim 10, wherein the at least one materialization operator stores a subset of rows and/or columns of a table.

12. A method comprising:
receiving a query;
determining a query plan including a sub plan structured as a directed acyclic graph;
generating, using the directed acyclic graph, a set of trees characterizing the sub plan, the set of trees including a first tree and a second tree, the first tree including at least one leaf characterizing a memory store operation and the second tree including a root characterizing a memory access operation, the memory store operator characterizing a database operation that stores fields required by other operators within nodes of the first tree and for use by operators within nodes of the second tree;
inserting, into the first tree and/or the second tree, at least one materialization operator, the inserting including first traversing the first tree and the second tree to calculate required database columns and second traversing the first tree and the second tree to insert the at least one materialization operator; and
storing the set of trees for use in execution of the query at run time.

13. The method of claim 12, wherein the memory access operator characterizes a second database operation that accesses the fields stored by the memory store operator, the accessed fields used by at least one additional operator within nodes of the second tree.

14. The method of claim 12, wherein the generating includes:
restructuring the sub plan into the set of trees that, taken together, represent operations of the directed acyclic graph;
inserting the memory store operator into the leaf of the first tree; and
inserting the memory access operator into the root of the second tree.

15. The method of claim 12, wherein the sub plan characterizes a collection of operators to access and/or operate on data in a database storage system, the collection of operators arranged in the directed acyclic graph.

16. The method of claim 12, further comprising:
generating, for each branch of the directed acyclic graph, a tree.

17. The method of claim 12, wherein a database execution engine includes a query optimizer including a plan generator that receives the sub query and performs the generating.

18. A non-transitory computer readable medium storing instructions which when executed by at least one processor forming part of at least one computing system cause the at least one processor to perform operations comprising:
receiving a query;
determining a query plan including a sub plan structured as a directed acyclic graph;
generating, using the directed acyclic graph, a set of trees characterizing the sub plan, the set of trees including a first tree and a second tree, the first tree including at least one leaf characterizing a memory store operation and the second tree including a root characterizing a memory access operation, the memory store operator characterizing a database operation that stores fields required by other operators within nodes of the first tree and for use by operators within nodes of the second tree;
inserting, into the first tree and/or the second tree, at least one materialization operator, the inserting including first traversing the first tree and the second tree to calculate required database columns and second traversing the first tree and the second tree to insert the at least one materialization operator; and
storing the set of trees for use in execution of the query at run time.

* * * * *